United States Patent [19]

Gollott et al.

[11] 4,266,509

[45] May 12, 1981

[54] METHOD AND APPARATUS FOR OFFSHORE DEPURATING HABITAT FOR SHELLFISH

[76] Inventors: Edgar R. Gollott, 1308-½ Lee St.; Thomas A. Gollott, 1390 E. Bayview Ave., both of Biloxi, Miss. 39530

[21] Appl. No.: 85,473

[22] Filed: Oct. 17, 1979

[51] Int. Cl.³ .............................................. A01K 61/00
[52] U.S. Cl. .......................................................... 119/2
[58] Field of Search ................. 119/2, 3, 4; 312/107.5, 312/126

[56] References Cited

U.S. PATENT DOCUMENTS

| | | | |
|---|---|---|---|
| 2,989,945 | 6/1961 | Ford | 119/4 |
| 3,702,599 | 11/1972 | Herolzer | 119/4 |
| 3,901,190 | 8/1975 | Wiegardt, Jr. | 119/2 X |
| 3,963,125 | 6/1976 | Baggott | 211/71 X |
| 4,067,444 | 1/1978 | Wilson | 211/126 |
| 4,159,009 | 6/1979 | Friedmann | 119/3 |

Primary Examiner—Gene Mancene
Assistant Examiner—Robert P. Swiatek
Attorney, Agent, or Firm—Harvey B. Jacobson

[57] ABSTRACT

An open framework enclosure is provided and defines a plurality of laterally spaced side-by-side sets of vertically spaced elongated horizontal cavities open at one set of corresponding ends. At least one open top tray is slidingly removably received in each of the cavities through the open ends thereof and the upper portions of corresponding adjacent cavities of adjacent sets of cavities are horizontally communicated and the upper and lower portions of adjacent vertically spaced cavities are in direct communication with each other. The trays include foraminated bottom, side and end walls and the enclosure defines structure for preventing movement of the trays between corresponding laterally spaced cavities, outwardly of the remote sides of the endmost cavities and outwardly from the ends of the cavities remote from the open ends thereof. Further, structure is provided for releasably lockingly retaining the trays within the enclosure against removal from the open ends of the cavities and the trays are sufficiently closely vertically spaced to prevent natural shellfish predators from entering the trays.

6 Claims, 6 Drawing Figures

METHOD AND APPARATUS FOR OFFSHORE DEPURATING HABITAT FOR SHELLFISH

BACKGROUND OF THE INVENTION

Approximately one-half of shellfish beds of the United States have been closed by the Federal Drug Administration because of high bacteria count. However, it has been found that shellfish may be harvested from beds having high bacteria count and thereafter placed in uncontaminated water for a predetermined length of time in order to allow the shellfish to depurate themselves.

Although depurating shellfish in this manner may be profitable and allow substantially twice the number of shellfish beds of the United States to be productive, past attempts at depurating shellfish have included harvesting of the shellfish from high bacteria count beds, transporting the harvested shellfish to uncontaminated waters and then dumping the shellfish into clean waters. After the shellfish have remained in clean water for a predetermined length of time, they depurate themselves and may thereafter be harvested for the second time.

However, it has been found that depurating shellfish in this manner results in considerable loss of shellfish inasmuch as the depurating process takes approximately fifteen days and some loss of shellfish occurs as a result of natural marine shellfish predators. Further, it is substantially impossible to harvest all of the shellfish during the second harvest and the shellfish, during the fifteen day depurating process are concentrated and thus easily pirated before the second harvest of the shellfish from the uncontaminated water may be accomplished.

Accordingly, a need exists for an apparatus whereby shellfish harvested from contaminated waters may be safely enclosed against natural marine predators and against pirating while allowing free current flow of water about the harvested shellfish for a period of approximately fifteen days during which the shellfish may depurate themselves.

Various forms of storage containers for trays of various types are disclosed in U.S. Pat. Nos. 2,046,095, 2,119,640, 2,943,747, 2,986,284, 3,199,683 and 3,963,125. However, these previously known structures are not well adapted for enabling safe and effective depuration of shellfish in the manner hereinafter set forth.

BRIEF DESCRIPTION OF THE INVENTION

The apparatus of the instant invention includes an open framework enclosure including structure for supporting a plurality of laterally spaced side-by-side sets of vertically spaced foraminated trays for containing shellfish and with the trays supported from the framework enclosure against unauthorized removal therefrom. Further, the framework enclosure is constructed in a manner whereby minimum vertical spacing between the trays is maintained allowing free current flow of water through the framework enclosure about the tray supported therefrom. In this manner, each of the trays may have water freely flow therethrough in response to water currents in the body of water in which the framework enclosure is disposed and shellfish contained within the trays may depurate themselves in approximately fifteen days or less. After the fifteen day or less period of depuration has ended, the framework enclosure is lifted from the water containing all of the trays and the shellfish therein. After removal of the framework enclosure from the water, the individual trays of shellfish may be removed from the framework enclosure.

The main object of this invention is to provide an apparatus whereby shellfish harvested from water having high bacteria count may be depurated in a relatively short period of time.

Another object of this invention is to provide an apparatus which will be capable of containing a large quantity of harvested shellfish.

Still another object of this invention is to provide an apparatus in accordance with the preceding objects and constructed in a manner which will prevent natural marine predators from having access to the shellfish within the trays supported from the framework enclosure.

Another important object of this invention is to provide a framework enclosure constructed in a manner whereby the trays of depurating shellfish supported therefrom may be locked within the framework enclosure against unauthorized removal therefrom and with the framework still retaining the ability for free current water flow therethrough.

A final object of this invention to be specifically enumerated herein is to provide an apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
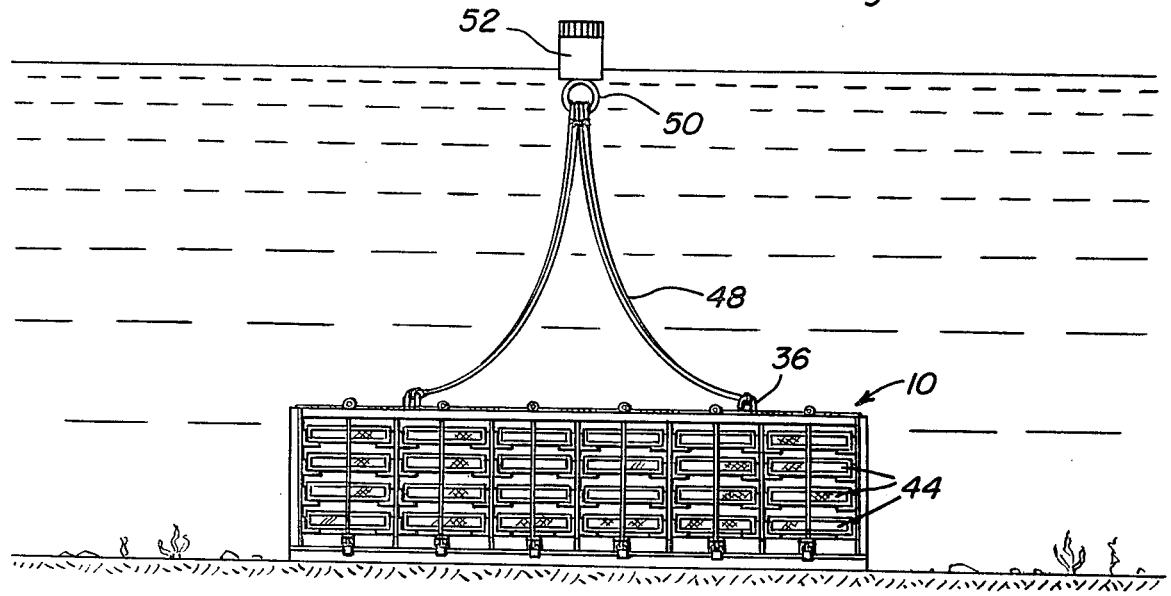
FIG. 1 is a side elevation view of an enclosure constructed in accordance with the present invention from which a plurality of foraminated trays for containing shellfish may be securely supported during depuration of the shellfish.
Figure 2:
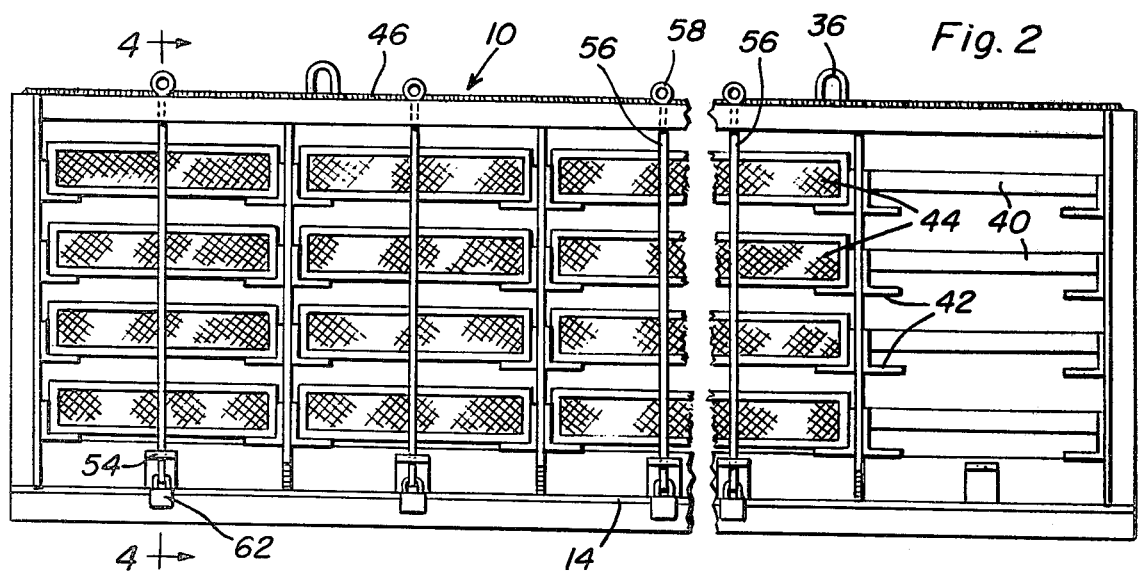
FIG. 2 is an enlarged fragmentary elevational view of the enclosure and with the foraminated shellfish trays removed from the righthand side of the enclosure.
Figure 3:
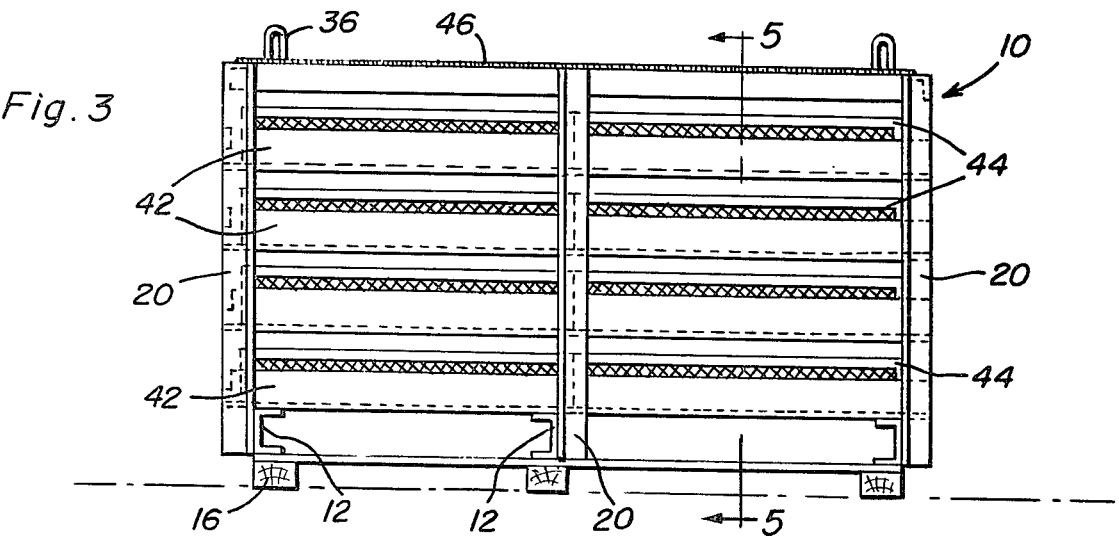
FIG. 3 is a side elevational view of the apparatus illustrated in FIG. 2.
Figure 4:
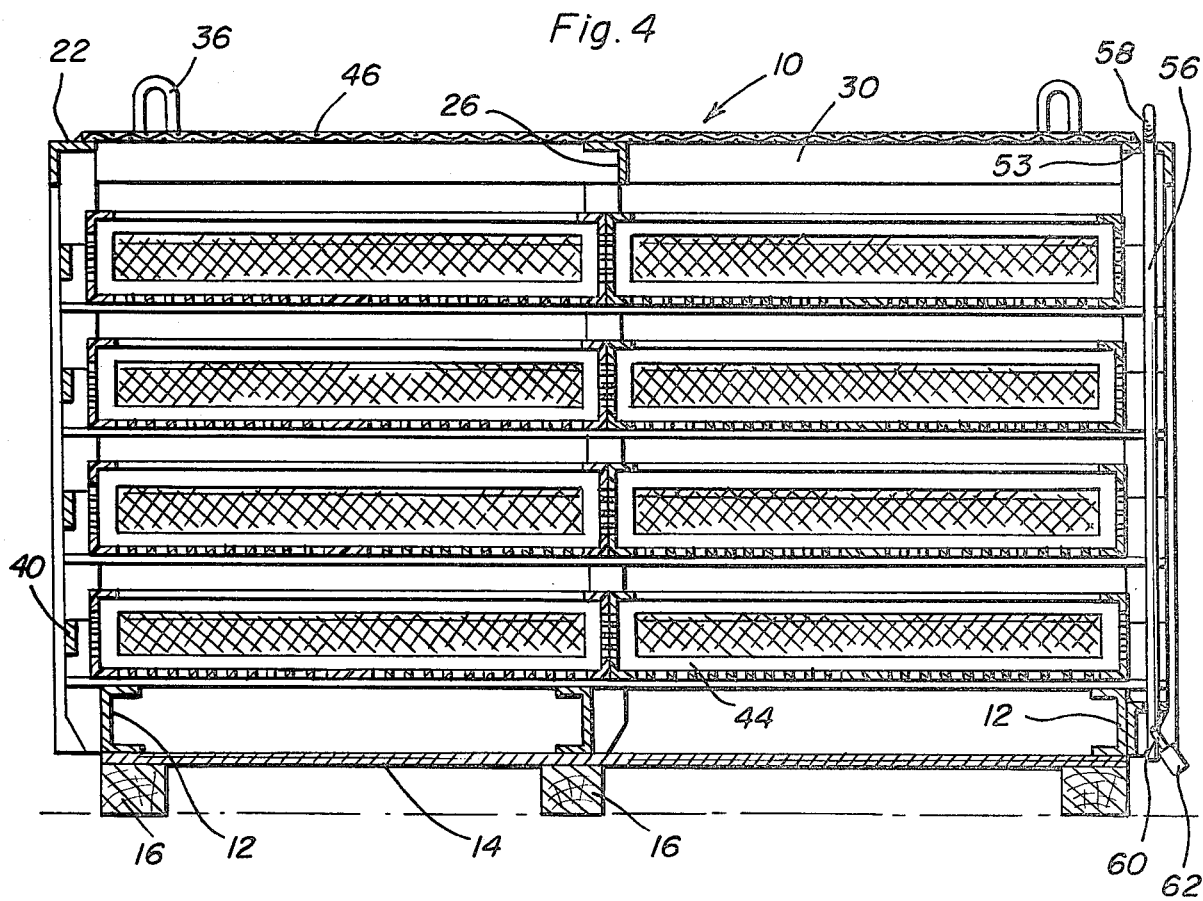
FIG. 4 is an enlarged fragmentary transverse vertical sectional view taken substantially upon the place indicated by the section line 4—4 of FIG. 2.
Figure 5:
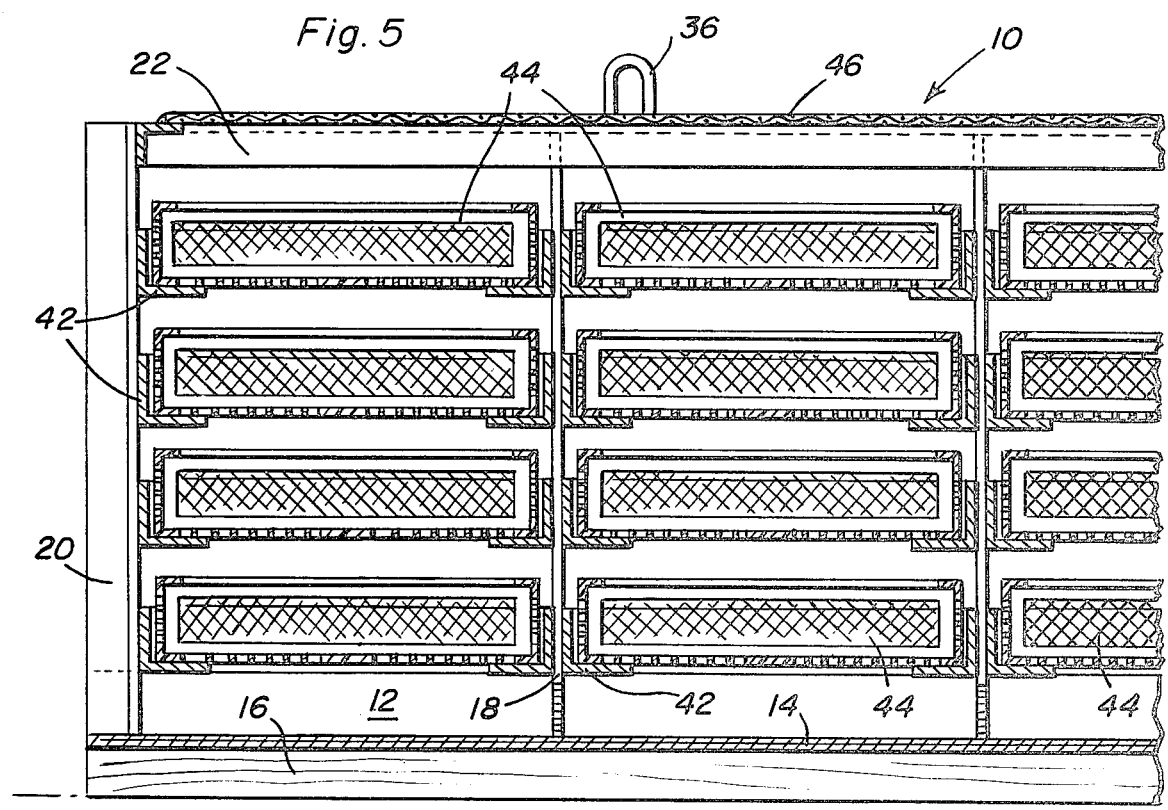
FIG. 5 is an enlarged fragmentary longitudinal sectional view taken substantially upon the plane indicated by the section line 5—5 of FIG. 3.

Referring now more specifically to the drawings, the numeral 10 generally designates an open framework enclosure including three lower longitudinal and transversely spaced channel members anchored relative to and interconnected by a panel structure 14 disposed thereunder and secured thereto. The panel structure 14 has three transversely spaced and longitudinally extending replaceable pressure treated wooden runners 16 secured to the underside thereof beneath the channel members 12 and each of the channel members 12 includes a plurality of upstanding longitudinally spaced uprights 18 and 20 supported therefrom. The uprights 20 comprise angle members and are disposed at the opposite ends of the open framework enclosure 10 and the uprights 18 are spaced along the open framework 10 between corresponding end uprights 20.

The upper ends of the uprights 18 and 20 are interconnected by a pair of upper opposite side longitudinal frame members 22 and upper opposite end transverse frame members 24. The upper ends of the uprights 18 and 20 are rigidly anchored to the frame members 22 and 24 and the open frame enclosure 10 further includes an upper longitudinal frame member 26 extending between the opposite end center uprights 20 and the uprights 18 spaced between the last mentioned uprights 20. Further, the open frame enclosure 10 includes three longitudinally spaced transverse upper frame members 28 and 30 spaced between the opposite end frame members 24 and a pair of diagonal upper frame members 32 interconnect opposite side ends of the frame members 28, the remote ends of the diagonal frame members 32 each supporting an anchor plate 34 from which an anchor eye 36 is supported.

Figure 6:
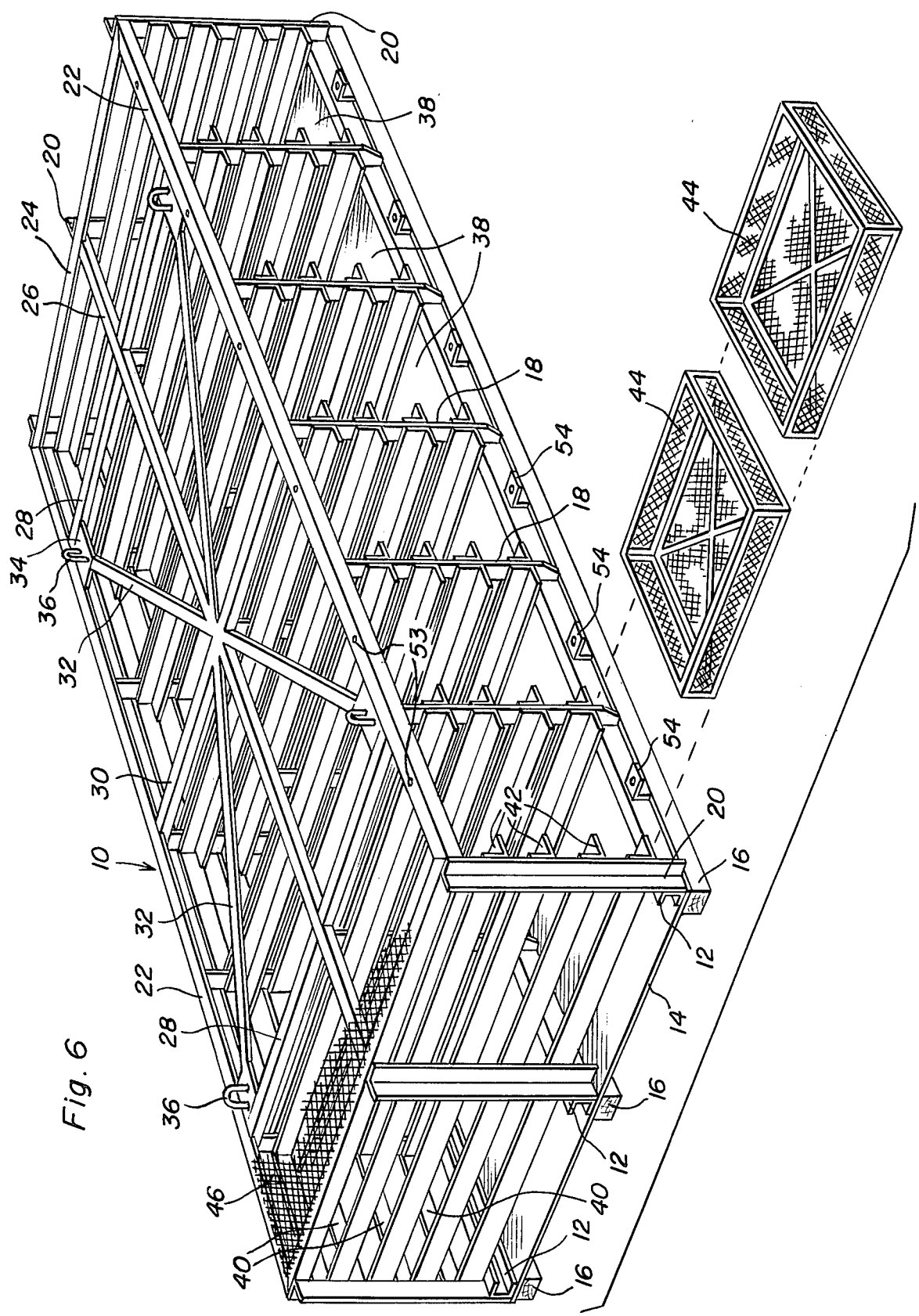
FIG. 6 is a perspective view of the enclosure with two of the associated shellfish supporting trays illustrated in exploded position.

The spaces between longitudinally spaced sets of transversely spaced uprights 18 and 20 define transversely extending elongated side-by-side receptacles 38. The near ends of the receptacles 38 illustrated in FIG. 6 are open and the far side ends of the receptacles 38 in FIG. 6 are closed by vertically spaced horizontal slats 40 secured between adjacent uprights 18 and uprights 20. Each of the receptacles 38 is divided into a plurality of vertically spaced cavities by vertically spaced pairs of horizontal angle members 42 secured to and supported from each set of longitudinally spaced sets of transversely spaced uprights 18 and 20. Each of the uprights 18 includes angle members 42 supported from the opposite sides thereof and each upright 20 has angle members 42 supported from the inner sides thereof. The angle members 42, in each receptacle 38, define a plurality of vertically spaced elongated horizontal cavities in which vertically spaced foraminated trays 44 may be slidingly received.

The top of the open frame enclosure 10 is closed by a heavy gauge wire mesh 46 and four suspension cables 48 have their lower ends anchored relative to the eyes 36 and their upper ends anchored relative to a lifting eye 50 from which a float 52 is supported. Also, it will be noted that the near side longitudinal frame member 22 in FIG. 6 includes a plurality of longitudinally spaced bores 53 formed therein and that the near side channel member 12 in FIG. 6 includes a plurality of longitudinally spaced outstanding apertured anchor brackets 54. A plurality of locking rods 56 having enlarged eyes 58 on their upper ends are provided and are downwardly receivable through the apertures 53 and the corresponding apertured brackets 54 and the lower ends of the rods 56 include diametric bores through which the hasps 60 of padlocks 62 may be secured, the rods 56 extending vertically downwardly across the open ends of the recesses 38 whereby the trays 44 supported from the angle members 42 may not be removed from the open framework enclosure 10 by unauthorized persons.

The trays 44 are approximately 2 feet wide, 3 feet long and 6 inches tall and may be conveniently constructed of a non-corrosive material such as plastic. The entire open framework enclosure 10, exclusive of the panel structure 14 and runner 16, may be constructed of galvanized steel or other suitable non-corrosive metal and each of the recesses 38 is of a horizontal length to receive two trays 44 therein. The slats 40 prevent movement of the trays 44 from the rear side of the open framework enclosure 10 illustrated in FIG. 6 and the vertical flange portions of the angle members 42 are approximately 4 inches in height, there being 8-inch spacing between vertically adjacent angle members 42. Accordingly, the trays 44 are received within the cavities defined by the angle members 42 in each recess 38 with approximately 2 inches clearance between vertically adjacent trays 44. Of course, inasmuch as the vertically adjacent angle members 42 are spaced apart 8 inches along the uprights 18 and 20, the vertical flanges of the angle members 42 are 4 inches high and the trays 44 are 6 inches high, the trays 44 may not be withdrawn between adjacent vertically spaced angle members 42. Further, the maximum 2-inch vertical clearance between adjacent trays 44 prevents marine predators from entering the open framework enclosure 10 in a manner such that they may gain access to shellfish contained within the trays.

In operation, shellfish are fish caught in closed waters or waters of high bacteria count and are washed and placed within the trays 44. The trays 44 are thereafter placed within the recesses 38 in supportive engagement with corresponding angle members 42 and the open framework enclosure 10 is taken to suitable water of low bacteria count approved by the Health Department. Thereafter, the open framework enclosure 10 will be lowered into the water for resting upon the bottom and allowed to remain for approximately fifteen days or less. Thereafter, the open framework enclosure 10 will be raised above the surface of the water and the shellfish within the trays 44 may be removed and marketed, the shellfish having depurated themselves during the fifteen days or less in which they were held in water of low bacteria count.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. An enclosure for depurating shellfish and protecting the shellfish against natural predators as well as theft, said enclosure including an open framework defining a plurality of laterally spaced apart sets of vertically spaced elongated horizontal cavities open at one set of corresponding ends only, at least one open tray slidably removably received in each of said cavities through the open end thereof, the upper portions of corresponding adjacent cavities of adjacent sets of cavities being horizontally communicated, said trays including foraminated bottom, side and end walls, said enclosure defining means preventing movement of said trays between corresponding laterally spaced cavities, outwardly of the remote sides of the endmost cavities and means releasably locking said trays against endwise removal from the open ends of said cavities, said cavities being vertically spaced apart approximately 2 inches more than the depth of said trays, thereby providing approximately 2 inches vertical spacing between adjacent vertically spaced trays the depth of said trays being greater than said vertical spacing.

2. The combination of claim 1 wherein the upper side of said open framework is closed by a heavy gauge wire mesh.

3. The combination of claim 1 wherein said trays are constructed of plastic material.

4. The method of depurating shellfish harvested from contaminated waters, said method comprising:
   (a) placing the shellfish harvested from contaminated water in a plurality of open top trays each including foraminated bottom, opposite side and end walls;
   (b) inserting said trays in an open framework enclosure with said trays stationarily supported within said enclosure in vertically spaced relation with at least 2 inches spacing between adjacent vertically spaced trays;
   (c) releasably locking said trays in said enclosures against unauthorized removal therefrom;
   (d) placing said enclosure and shellfish containing trays supported therefrom at a predetermined depth in a substantially non-contaminated body of water; and
   (e) removing said enclosure and shellfish containing trays from said non-contaminated body of water after a predetermined lapse of time.

5. The method of claim 4 wherein (b) includes establishing sufficient spacing between said trays to allow free tidal current circulation of water throughout said enclosure about and through said trays.

6. The method of claim 4 wherein the lapse of time in (e) comprises approximately fifteen days.

* * * * *